(12) United States Patent
Marinier (10) Patent No.: US 7,808,944 B2
(45) Date of Patent: Oct. 5, 2010

(54) WIRELESS COMMUNICATION METHOD AND APPARATUS FOR CONTROLLING THE TRANSMISSION POWER OF DOWNLINK AND UPLINK CODED COMPOSITE TRANSPORT CHANNELS BASED ON DISCONTINUOUS TRANSMISSION STATE VALUES

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 1421 days.

(21) Appl. No.: 10/956,419

(22) Filed: Oct. 1, 2004

(65) Prior Publication Data
US 2005/0124373 A1 Jun. 9, 2005

Related U.S. Application Data

(60) Provisional application No. 60/523,973, filed on Nov. 21, 2003.

(51) Int. Cl.
H04B 7/185 (2006.01)
(52) U.S. Cl. .................. 370/318; 370/336; 370/474
(58) Field of Classification Search .............. 370/11, 370/336, 474, 318
See application file for complete search history.

(56) References Cited

U.S. PATENT DOCUMENTS

| | | | |
|---|---|---|---|
| 6,035,209 A | 3/2000 | Tiedemann, Jr. et al. | |
| 6,249,683 B1 | 6/2001 | Lundby et al. | |
| 6,337,987 B1 | 1/2002 | Agin et al. | |
| 6,421,327 B1 | 7/2002 | Lundby et al. | |
| 6,545,989 B1 | 4/2003 | Butler | |
| 6,628,958 B1 | 9/2003 | Kamel et al. | |
| 6,819,938 B2 | 11/2004 | Sahota | |
| 6,944,469 B2 | 9/2005 | Jo et al. | |
| 7,016,699 B2 * | 3/2006 | Koo et al. | 455/522 |
| 7,069,033 B1 | 6/2006 | Moon et al. | |
| 7,197,021 B2 * | 3/2007 | Seo et al. | 370/335 |
| 7,230,932 B2 * | 6/2007 | Numminen | 370/311 |
| 7,340,269 B2 | 3/2008 | Ahn et al. | |
| 2001/0024451 A1 * | 9/2001 | Le Strat et al. | 370/468 |
| 2001/0040880 A1 | 11/2001 | Chen et al. | |
| 2002/0009061 A1 * | 1/2002 | Willenegger | 370/328 |
| 2002/0042284 A1 * | 4/2002 | Benoist et al. | 455/522 |

(Continued)

FOREIGN PATENT DOCUMENTS

EP 1 045 528 10/2000

(Continued)

Primary Examiner—Nay A Maung
Assistant Examiner—Richard Chan
(74) Attorney, Agent, or Firm—Volpe and Koenig, P.C.

(57) ABSTRACT

A wireless communication method and apparatus for controlling the power of signals transmitted by downlink (DL) and/or uplink (UL) coded composite transport channels (CCTrCHs). A base station transmits signals to a wireless transmit/receive unit (WTRU) via at least one DL CCTrCH, and/or the WTRU transmits signals to the base station via at least one UL CCTrCH. The base station determines whether or not discontinuous transmission (DTX) of a UL CCTrCH that controls the power of a DL CCTrCH is employed, and/or the WTRU determines whether or not DTX of a DL CCTrCH that controls the power of a UL CCTrCH is employed. The power of the CCTrCHs is incremented or decremented by a first step size when DTX is employed, and by a second step size when DTX is not employed.

14 Claims, 4 Drawing Sheets

U.S. PATENT DOCUMENTS

| | | | |
|---|---|---|---|
| 2002/0115460 A1* | 8/2002 | Rune et al. | 455/522 |
| 2003/0039217 A1* | 2/2003 | Seo et al. | 370/318 |
| 2003/0119452 A1 | 6/2003 | Kim et al. | |
| 2004/0114574 A1 | 6/2004 | Zeira et al. | |

FOREIGN PATENT DOCUMENTS

| | | |
|---|---|---|
| EP | 1 143 634 | 10/2001 |
| EP | 1 235 454 | 8/2002 |
| RU | 2000118826 | 7/2002 |
| RU | 2000125740 | 9/2002 |
| RU | 2000125750 | 10/2002 |
| RU | 2003118456 | 10/2004 |
| WO | 98/36508 | 8/1998 |
| WO | 03/044985 | 5/2003 |

* cited by examiner

WIRELESS COMMUNICATION METHOD AND APPARATUS FOR CONTROLLING THE TRANSMISSION POWER OF DOWNLINK AND UPLINK CODED COMPOSITE TRANSPORT CHANNELS BASED ON DISCONTINUOUS TRANSMISSION STATE VALUES

CROSS REFERENCE TO RELATED APPLICATION

This application claims priority from U.S. Provisional Patent Application Ser. No. 60/523,973, filed Nov. 21, 2003, which is incorporated by reference as if fully set forth herein.

FIELD OF INVENTION

The present invention relates to a wireless communication system including at least one base station and at least one wireless transmit/receive unit (WTRU) that communicate with each other via uplink (UL) and downlink (DL) coded composite transport channels (CCTrCHs). More particularly, the present invention relates to updating the transmission power of the DL and UL CCTrCHs differently based on whether or not discontinuous transmission (DTX) is employed on the feedback link from which the transmit power control (TPC) commands are received.

BACKGROUND

Closed-loop power control is a technique widely used in wireless communication systems such as universal terrestrial radio access (UTRA) frequency division duplex (FDD), UTRA time division duplex (TDD) 3.84/1.28 Mcps, code division multiple access (CDMA) one, or the like. The transmission power of a WTRU or base station is adjusted periodically according to feedback information sent in the opposite link by a receiver in the base station or WTRU.

For example, consider closed-loop power control in a DL which controls the power transmitted by a base station for a specific WTRU. The WTRU receives the signal from the base station during a certain period of time, (e.g., a time slot or a frame), and determines whether or not the transmission power of the base station needs to be adjusted up or down using a particular quality criterion, such as the signal-to-noise-plus-interference ratio. At the time of the next transmission from the WTRU to the base station (UL), the WTRU sends, along with other UL data, a TPC command containing the relevant information for the base station to adjust its transmission power at the subsequent DL transmission.

In many systems, the TPC command contains only one information bit indicating whether the power should be increased or decreased by a pre-determined amount, or step size. The accuracy of the power adjustment may be improved by using more than one information bit per TPC command, (allowing multiple step sizes), or by increasing the frequency of the TPC commands. The disadvantage of doing this is that the amount of transmitted UL data needs to be reduced to create room for this additional TPC information. Thus, there is a trade-off between power control accuracy in one direction and the data rate in the opposite direction.

In UTRA TDD, (3.84 Mcps and 1.28 Mcps), DL power control for dedicated physical channels (DPCHs) and physical DL shared channels (PDSCHs) is closed-loop and works in the manner described in the above paragraphs. In addition, in UTRA TDD, (1.28 Mcps option only), UL power control is also closed-loop for DPCHs and physical uplink shared channels (PUSCHs).

The following standard parameters apply to UTRA TDD with respect to closed-loop power control. Each TPC command (up or down) consists of one information bit. The TPC step size (up or down) can be 1 dB, 2 dB or 3 dB and is determined at radio link setup. For DL power control, a DL channel is associated to at least one UL channel that provides one or more TPC commands. This DL channel may be a multiplexed channel of several transport channels (TrCHs), where each TrCH can carry a different communication service. This multiplexed channel is referred to as a CCTrCH.

Typically, there is a single UL CCTrCH mapped to each DL CCTrCH, and there is one TPC command every frame of 10 ms (for 3.84 Mcps option) or sub-frame of 5 ms (for 1.28 Mcps option). Conversely, for UL power control, (for the 1.28 Mcps option only), a UL CCTrCH is associated to a DL CCTrCH that provides the TPC commands. Typically, there is one TPC command every sub-frame of 5 ms. There may be more than one TPC command if the UL CCTrCH occupies more than one time slot (one TPC command per time slot every sub-frame).

A CCTrCH subject to power control, (a DL CCTrCH for DL power control, a UL CCTrCH for UL power control), is referred to as the power-controlled CCTrCH. A feedback CCTrCH is the CCTrCH to which the power-controlled CCTrCH is associated, and which provides it with the TPC commands, (a UL CCTrCH for DL power control, a DL CCTrCH for UL power control). The base station or WTRU transmitting the power-controlled CCTrCH also receives the feedback CCTrCH, while the base station or WTRU receiving the power-controlled CCTrCH also transmits the feedback CCTrCH.

DTX is employed in UTRA TDD systems, (1.28 Mcps and 3.84 Mcps), on a CCTrCH basis when there is no data to transmit for this CCTrCH. A CCTrCH supports part or all of the transmissions of a user. A user may use one or several CCTrCH's within a given timeslot. When DTX is activated for a CCTrCH, there will be no transmission on any physical channel supporting this CCTrCH, except for the first physical channel and only every special burst generation period (SBGP) frames (for uplink) or every special burst scheduling parameter (SBSP) frames (for DL), where SBGP or SBSP is configured at radio link setup. The use of DTX results in significant system and user performance benefits as less interference is generated in the system, and handset battery life may be conserved in the UL.

A problem occurs in UTRA TDD (3.84 Mcps and 1.28 Mcps) when DTX is used on a UL CCTrCH. This UL CCTrCH is the feedback, (i.e., the CCTrCH providing the TPC command), for a DL power-controlled CCTrCH. When this UL CCTrCH is in DTX, the TPC command is only transmitted when the special burst is transmitted, i.e., at every SBGP frame. As a result, the frequency transmission power updates are reduced dramatically and the result can be poor performance for the power-controlled CCTrCH. The same problem would occur in UTRA TDD (1.28 Mcps option only) when DTX is used on a DL CCTrCH and when this DL CCTrCH is the feedback CCTrCH for a UL CCTrCH. In this case, the UL performance would suffer. However, this performance deterioration could be mitigated if the TPC size were increased while the feedback (UL) CCTrCH is in DTX.

In a conventional wireless communication system, a single TPC step size is used regardless of the frequency at which the TPC commands arrive on the feedback CCTrCH. In case of DTX on the feedback CCTrCH, the TPC commands may arrive from 2 to 256 times less frequently than in a normal transmission (depending on the value of the SBGP or SBSP). Thus, the system designer or operator has three different options with respect to the configuration of a radio link when DTX can occur in the feedback CCTrCH.

A first option is to use a TPC step size optimized for normal transmission on the feedback CCTrCH, and experience poor performance in the power-controlled CCTrCH during the DTX transmission on the feedback CCTrCH. This is not acceptable if DTX happens often in the feedback CCTrCH.

A second option is to use a TPC step size optimized for DTX transmission on the feedback CCTrCH, and experience sub-optimal performance in the power-controlled CCTrCH during normal transmission on the feedback CCTrCH. Sub-optimal performance would result from using a larger-than-necessary TPC step size during normal transmission on the feedback CCTrCH, when TPC commands arrive frequently.

A third option is to reduce the special burst periodicity (SBGP or SBSP) to the minimum possible value so as to reduce as much as possible the impact on the performance of the power-controlled CCTrCH. This would result in wiping out any capacity or battery consumption benefit from the use of DTX in the feedback CCTrCH.

A fourth option is to use more than one information bit in the TPC command, enabling the node transmitting the feedback CCTrCH to signal a larger step size when it is using DTX. However, this has the disadvantage of reducing the capacity of the feedback CCTrCH as explained earlier.

None of these options is satisfactory, and would result in a loss of system performance. What is needed is enhanced performance in both normal and DTX cases for the feedback CCTrCH.

SUMMARY

The present invention is related to a wireless communication method and apparatus for controlling the power of signals transmitted by DL and/or UL CCTrCHs. The apparatus may be a wireless communication system, a base station, a WTRU or an integrated circuit (IC).

A base station transmits signals to a WTRU via at least one DL CCTrCH, and/or the WTRU transmits signals to the base station via at least one UL CCTrCH. The base station determines whether or not DTX of a UL CCTrCH that controls the power of a DL CCTrCH is employed, and/or the WTRU determines whether or not DTX of a DL CCTrCH that controls the power of a UL CCTrCH is employed. The power of the CCTrCHs is incremented or decremented by a first step size when DTX is employed. The power of the CCTrCHs is incremented or decremented by a second step size when DTX is not employed.

A wireless communication system used to implement the present invention includes a radio network controller (RNC), at least one base station and at least one WTRU. The RNC may transmit a DL TPC step size notification signal to the base station for controlling the power of signals transmitted via the DL CCTrCH, and/or the RNC may transmit a UL TPC step size notification signal to the WTRU, (via the base station), for controlling the power of signals transmitted via the UL CCTrCH.

The base station of the system may include means for determining whether or not DTX of a UL CCTrCH that controls the power of a DL CCTrCH is employed, means for receiving a UL CCTrCH including a TPC command for the DL CCTrCH, and means for updating the power of the DL CCTrCH, based on the TPC command, by incrementing or decrementing the power by a step size value indicated by the DL TPC step size notification signal. The step size value is dependent on whether or not the determining means determines that DTX is employed.

A UL CCTrCH may be received by the base station during each of a plurality of predetermined time frames. The base station may determine that DTX is employed for a UL CCTrCH that controls the power of a DL CCTrCH if the UL CCTrCH is not received for a given predetermined time frame. The base station may determine that DTX is not employed for a UL CCTrCH that controls the power of the DL CCTrCH, if the UL CCTrCH is received in two consecutive predetermined time frames, and DTX was employed for the UL CCTrCH. The length of the given predetermined time frame may be ten (10) milliseconds. The wireless communication system may be a UTRA TDD system.

The DL TPC step size notification signal may be embedded as an information element within a radio link setup request message, a radio link addition request message, or a radio link reconfiguration prepare message.

A UL CCTrCH may also be received during each of a plurality of predetermined time sub-frames. The base station may determine that DTX is employed for a UL CCTrCH that controls the power of a DL CCTrCH if the UL CCTrCH is not received for a given predetermined time sub-frame. The length of the given predetermined time sub-frame may be five (5) milliseconds.

The WTRU of the system may include means for determining whether or not DTX of a DL CCTrCH that controls the power of a UL CCTrCH is employed, means for receiving a DL CCTrCH including a TPC command for the UL CCTrCH, and means for updating the power of the UL CCTrCH, based on the TPC command, by incrementing or decrementing the power by a step size value indicated by the UL TPC step size notification signal. The step size value is dependent whether or not the determining means determines that DTX is employed.

A DL CCTrCH may be received during each of a plurality of predetermined time frames. The WTRU may determine that DTX is employed for a DL CCTrCH that controls the power of a UL CCTrCH if the DL CCTrCH is not received for a given predetermined time frame. The WTRU may determine that DTX is not employed for a DL CCTrCH that controls the power of a UL CCTrCH, if the DL CCTrCH is received in two consecutive predetermined time frames, and DTX was employed for the DL CCTrCH.

A DL CCTrCH may also be received during each of a plurality of predetermined time sub-frames. The WTRU may determine that DTX is employed for a DL CCTrCH that controls the power of a UL CCTrCH if the DL CCTrCH is not received for a given predetermined time sub-frame. The length of the given predetermined time sub-frame may be 5 milliseconds.

The UL TPC step size notification signal may be embedded as an information element within a group of UL dedicated physical channel (DPCH) power control information signals.

DETAILED DESCRIPTION OF THE PREFERRED EMBODIMENT(S)

Hereafter, the terminology "WTRU" includes but is not limited to a user equipment (UE), mobile station, fixed or mobile subscriber unit, pager, or any other type of device capable of operating in a wireless environment.

When referred to hereafter, the terminology "base station" includes but is not limited to a Node-B, a site controller, an access point or any other type of interfacing device in a wireless environment.

The present invention may be further applicable to TDD, FDD, and time division synchronous CDMA (TD-SCDMA), as applied to a universal mobile telecommunications system (UMTS), CDMA 2000 and CDMA in general, but is envisaged to be applicable to other wireless systems as well.

The features of the present invention may be incorporated into an IC or be configured in a circuit comprising a multitude of interconnecting components.

Figure 1:
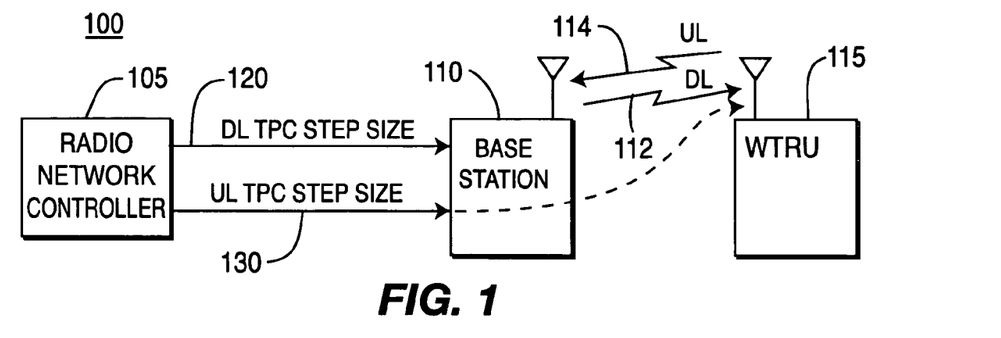
FIG. 1 is a block diagram of a wireless communication configured in accordance with the present invention.

FIG. 1 shows a wireless communication system 100 including an RNC 105, a base station 110 and a WTRU 115. The base station 110 transmits signals to the WTRU 115 via at least one DL CCTrCH 112 and the WTRU 115 transmits signals to the base station 110 via at least one UL CCTrCH 114. The RNC 105 transmits a DL TPC step size notification signal 120 to the base station 110, and/or a UL TPC step size notification signal 130 to the WTRU 115 via the base station 110 using, for example, radio resource control (RRC) signaling.

Both UL and DL power control can be enhanced by the present invention. Although explained in the context of UTRA TDD, the present invention is applicable to any communication system that employs DTX in the direction of the power control command transmission. With respect to DL power control, in the context of UTRA TDD (3.84 Mcps and 1.28 Mcps), the notification of the TPC step size to use in case of DTX in the UL can be implemented through the modification of the messages from the RNC 105 to the base station 110 that contain radio link configuration information.

Figure 2A:
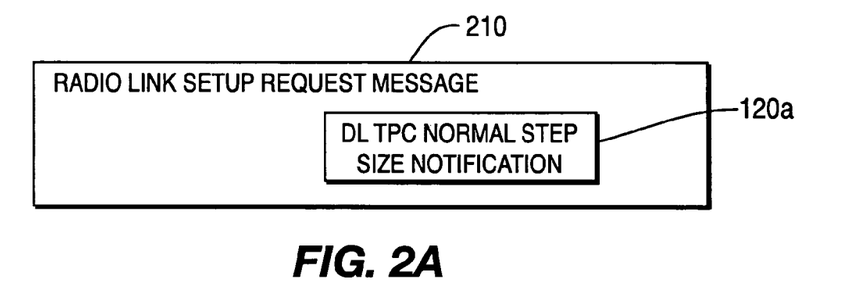
FIGS. 2a, 2b and 2c illustrate various radio link messages having a DL TPC normal step size notification signal embedded therein when the DTX state has a normal value in accordance with the present invention.
Figure 2B:
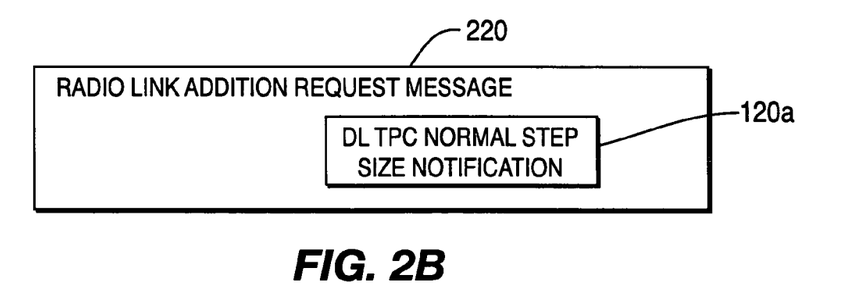
Figure 2C:
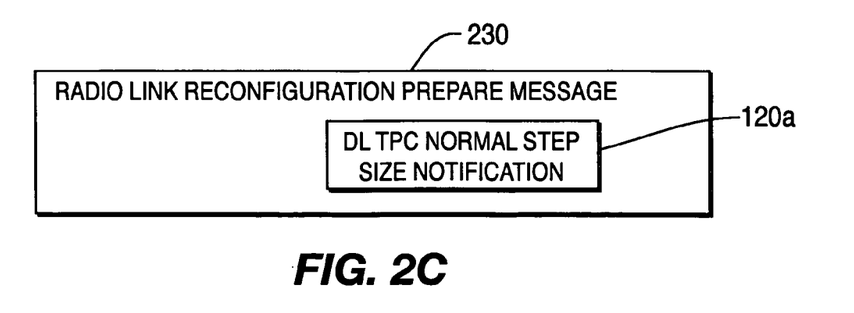

As shown in FIGS. 2a, 2b and 2c, a DL TPC normal step size notification signal 120a can be embedded as an information element within one of several messages that contain configuration information for radio links. These messages are radio link setup request message 210, radio link addition request message 220 or a radio link reconfiguration prepare message 230.

Figure 3A:
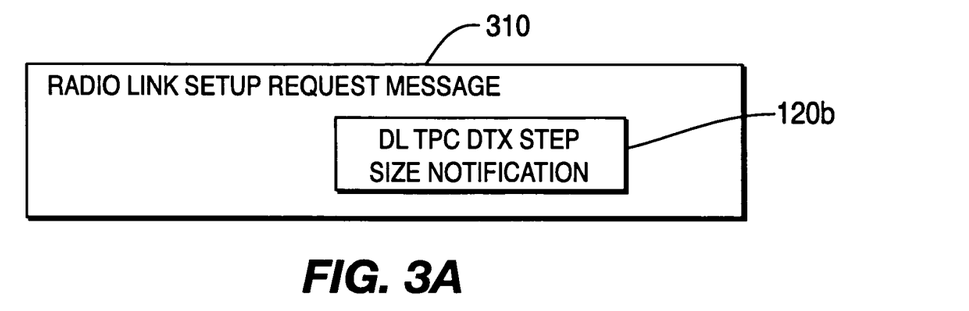
FIGS. 3a, 3b and 3c illustrate various radio link messages having a DL TPC DTX step size notification signal embedded therein when the DTX state has a discontinuous value in accordance with the present invention.
Figure 3B:
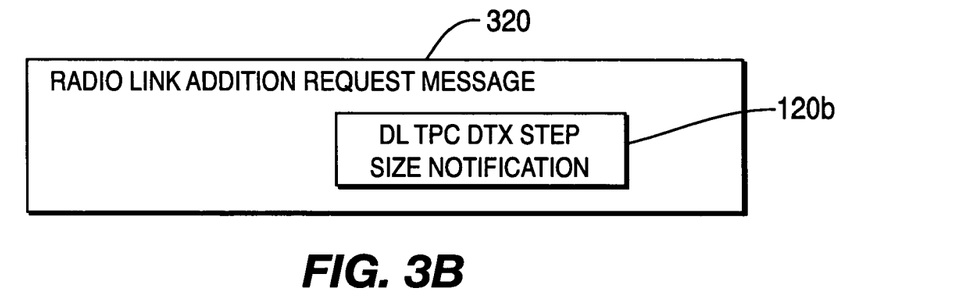
Figure 3C:
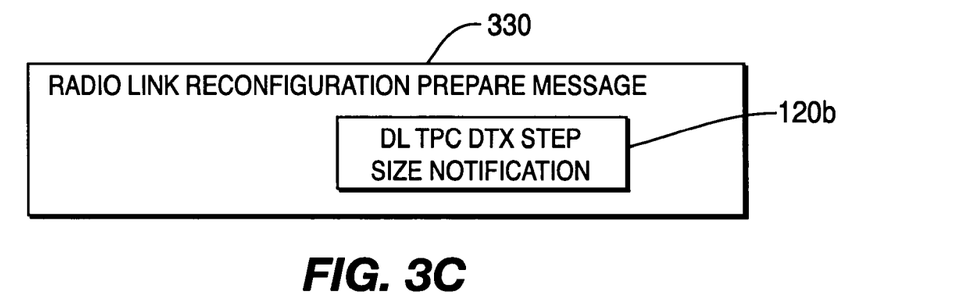

Alternatively, as shown in FIGS. 3a, 3b and 3c, if the feedback CCTrCH can be in DTX, a DL TPC DTX step size notification signal 120b is sent, as an information element in radio link setup request message 310, radio link addition request message 320 or radio link reconfiguration prepare message 330. This alternative is kept optional in case it is known in advance that DTX will not be used in the UL, or in case it is desired to use the same DL TPC step size for both DTX and normal (non-DTX) UL transmission. By convention, the base station 110 would then use the same DL TPC step size for both DTX and normal UL transmission if it were not provided the DL TPC DTX step size notification signal 120b by the RNC 105.

During transmission, every 10 ms frame (for 3.84 Mcps option) or 5 ms sub-frame (for 1.28 Mcps option), the base station 110 needs to determine the updated transmission power for every DL CCTrCH of the radio link. For each DL CCTrCH, a DTX state is defined for the corresponding feedback (UL) CCTrCH. At a given moment, this DTX state can take the value "discontinuous" if feedback CCTrCH is in DTX, or "normal" if feedback (UL) CCTrCH is in not in DTX. The initial value of the DTX state is "normal". If the DTX state is "normal" and the feedback CCTrCH is not received for a given frame, the DTX state is switched to "discontinuous". If the DTX state is "discontinuous" and the feedback CCTrCH is received in two consecutive frames, the DTX state is switched to "normal".

Given the DTX state, the transmission power of the power-controlled CCTrCH is updated as follows. If a TPC command was received for the power-controlled CCTrCH since the last transmission of this CCTrCH (in a previous frame), and the DTX state is "normal", the transmission power is updated by +(DL TPC normal step size signal 120a) dB if the TPC command was up, or by −DL TPC normal step size signal 120a) dB if the TPC command was down. If a TPC command was received for the power-controlled CCTrCH since the last transmission of this CCTrCH (in a previous frame), and the DTX state is "discontinuous", the transmission power is updated by +(DL TPC DTX step size signal 120b) dB if the TPC command was up, or by −(DL TPC DTX step size signal 120b) dB if the TPC command was down. If no TPC command was received for the power-controlled CCTrCH since the last frame transmission of this CCTrCH, the transmission of this CCTrCH remains unchanged.

UL power control for UTRA TDD (1.28 Mcps option only) sends a UL step size notification signal 130 to the WTRU 115 via the base station 110 using RRC signaling. This signaling is sent through a dedicated control channel (DCCH) set up between the RNC 105 and the WTRU 115. Physically, the UL step size information is transmitted to the base station 110, which then wirelessly forwards the information to the WTRU 115 without decoding the information, i.e., the UL step size information is transparent to the base station 110.

Figure 4:
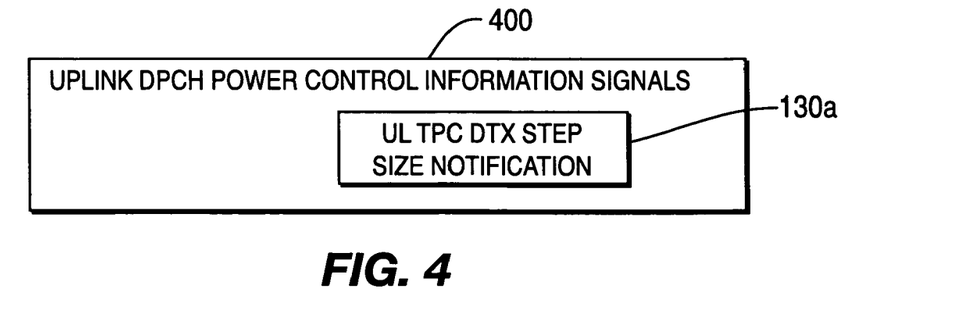
FIG. 4 illustrates a group of uplink DPCH power control information signals having a UL TPC DTX step size notification signal embedded therein when the DTX state has a discontinuous value in accordance with the present invention.

As shown in FIG. 4, the notification of the step size to use in case of DTX in the DL can be implemented through the addition of a new information element UL TPC DTX step size signal 130a within a group of "Uplink DPCH power control information" signals. This UL TPC DTX step size signal 130a could be optional, in case it is known in advance that DTX will not be used in the DL, or in case it is desired to use the same UL TPC step size for both DTX and normal (non-DTX) DL transmission. By convention, the WTRU 115 would then use the same UL TPC step size for both DTX and normal DL transmission if it were not provided the UL TPC DTX step size signal 130a by the RNC.

During transmission, every 5 ms sub-frame (for 1.28 Mcps option) the WTRU 115 needs to determine the updated transmission power for every UL CCTrCH of the radio link. For each UL CCTrCH, a "DTX state" is defined for the corresponding feedback (DL) CCTrCH. At a given moment, this state can take the value "discontinuous" or "normal" according to whether the feedback (DL) CCTrCH is in DTX or not. The initial value of the DTX state is "normal". If the DTX state is "normal" and the feedback CCTrCH is not received for a given frame, the DTX state is switched to "discontinuous". If the DTX state is "discontinuous" and the feedback CCTrCH is received in two consecutive frames, the DTX state is switched to "normal".

Given the DTX state, the transmission power of the power-controlled CCTrCH is updated as follows. If a TPC command was received for the power-controlled CCTrCH since the last transmission of this CCTrCH (in a previous frame), and the DTX state is "normal", the transmission power is updated by +(TPC step size 120a) dB if the TPC command was up, or by −(TPC step size 120a) dB if the TPC command was down. If a TPC command was received for the power-controlled CCTrCH since the last transmission of this CCTrCH (in a previous frame), and the DTX state is "discontinuous", the transmission power is updated by +(TPC DTX step size 120b) dB if the TPC command was up, or by −(TPC DTX step size 120b) dB if the TPC command was down. If no TPC command was received for the power-controlled CCTrCH since the last frame transmission of this CCTrCH, the transmission of this CCTrCH remains unchanged.

In an alternative embodiment, a variable TPC step size may be used. This would allow the receiver of the power-controlled CCTrCH, (the WTRU 115 in the case of DL, the base station 110 in the case of UL), to dynamically command a higher step size if the SIR falls too low compared to the target, as often happens when the frequency of transmission power updates is reduced due to DTX in the feedback CCTrCH.

Figure 5:
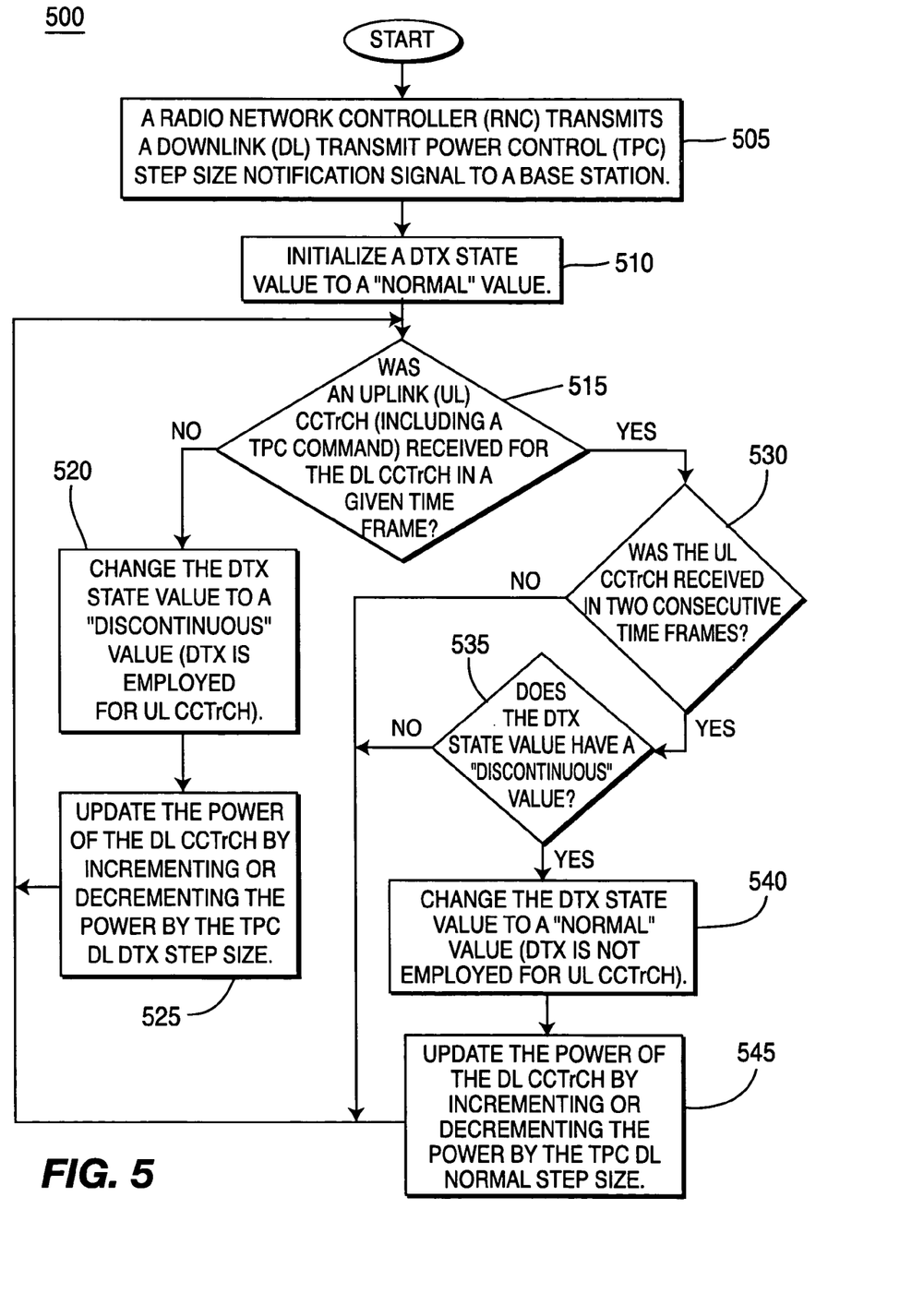
FIG. 5 is a flowchart of a process including method steps for controlling the power of signals transmitted via a DL CCTrCH in accordance with the present invention.

FIG. 5 is a flowchart of a process 500 including method steps for controlling the power of signals transmitted via a DL CCTrCH in accordance with the present invention. In step 505, the RNC 105 transmits a DL TPC step size notification signal 120 to the base station 110. In step 510, the DTX state value is initialized to a "normal" value. In step 515, a determination is made as to whether or not a UL CCTrCH, including a TPC command, is received for the DL CCTrCH in a given time frame.

If a UL CCTrCH is not received in the given time frame, the DTX state value is changed to a "discontinuous" value (step 520), indicating that DTX is employed for the UL CCTrCH. In step 525, the power of the DL CCTrCH is updated by incrementing or decrementing the power by the TPC DL DTX step size.

If a UL CCTrCH is received in the given time frame, a determination is made as to whether or not the UL CCTrCH was received in two consecutive frames (step 530). If the UL CCTrCH was received in two consecutive frames, as determined in step 530, and the DTX state value is a "discontinuous" value, as determined in step 535, the DTX state value is changed to the "normal" value, indicating that DTX is not employed for the UL CCTrCH (step 540). In step 545, the power of the DL CCTrCH is updated by incrementing or decrementing the power by the TPC DL normal step size.

Figure 6:
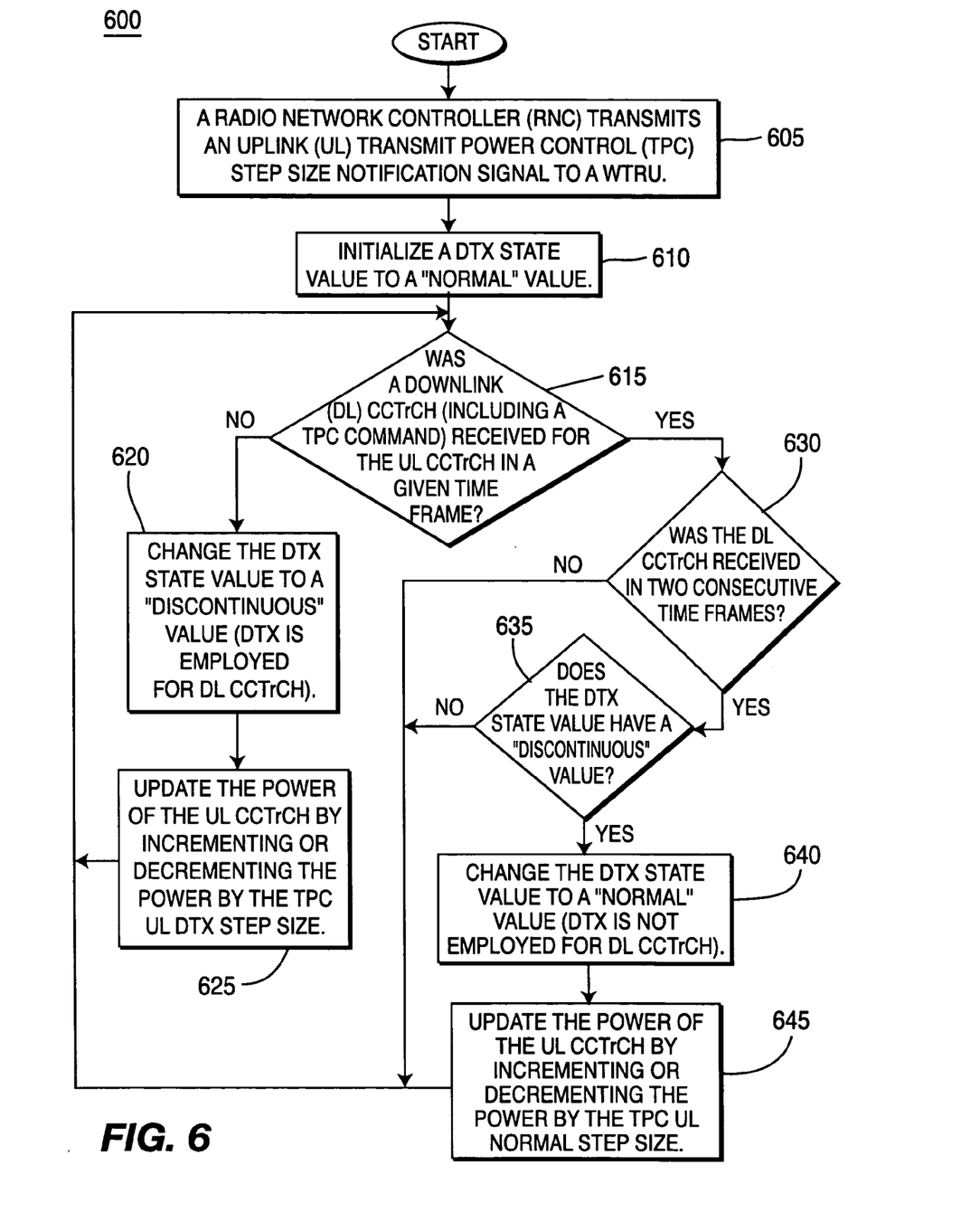
FIG. 6 is a flowchart of a process including method steps for controlling the power of signals transmitted via a UL CCTrCH in accordance with the present invention.

FIG. 6 is a flowchart of a process 600 including method steps for controlling the power of signals transmitted via a UL CCTrCH in accordance with the present invention. In step 605, the RNC 105 transmits a UL TPC step size notification signal 130 to the WTRU 115. In step 610, the DTX state value is initialized to a "normal" value. In step 615, a determination is made as to whether or not a DL CCTrCH, including a TPC command, is received for the UL CCTrCH in a given time frame.

If a DL CCTrCH is not received in the given time frame, the DTX state value is changed to a "discontinuous" value (step 620), indicating that DTX is employed for the DL CCTrCH. In step 625, the power of the UL CCTrCH is updated by incrementing or decrementing the power by the TPC UL DTX step size.

If a DL CCTrCH is received in the given time frame, a determination is made as to whether or not the DL CCTrCH was received in two consecutive frames (step 630). If the DL CCTrCH was received in two consecutive frames, as determined in step 630, and the DTX state value is a "discontinuous" value, as determined in step 635, the value of the DTX state is changed to the "normal" value, indicating that DTX is not employed for the DL CCTrCH (step 640). In step 645, the power of the UL CCTrCH is updated by incrementing or decrementing the power by the TPC UL normal step size.

While this invention has been particularly shown and described with reference to preferred embodiments, it will be understood by those skilled in the art that various changes in form and details may be made therein without departing from the scope of the invention described hereinabove.

What is claimed is:

1. A method of controlling the power of signals transmitted by a base station via a downlink (DL) channel, the method comprising:
   receiving at least one transmit power control (TPC) step size value notification signal including TPC step size value information that enables the base station to define a first TPC step size value and a second TPC step size value;
   determining whether or not discontinuous transmission (DTX) of an uplink (UL) channel that controls the power of the DL channel is employed;
   receiving via the UL channel a DL TPC command subsequent to the determining; and
   adjusting the power of the signals transmitted via the DL channel in response to the DL TPC command by:
      incrementing or decrementing the power by the first step size value on a condition that the determining indicates that DTX of the UL channel is employed; or
      incrementing or decrementing the power by the second step size value on a condition that the determining indicates that DTX of the UL channel is not employed, wherein it is determined that DTX of the UL channel is employed on a condition that the UL channel is not received for a given predetermined time frame.

2. The method of claim 1 wherein the UL channel is a transport channel.

3. The method of claim 1 wherein the DL channel is a transport channel.

4. The method of claim 1 wherein the UL channel and the DL channel are coded composite transport channels (CCTrCHs).

5. The method of claim 1 wherein the TPC step size value notification signal is received on a dedicated control channel (DCCH).

6. The method of claim 1 wherein the TPC step size value notification signal is received from a radio network controller (RNC).

7. A method of controlling the power of signals transmitted by a wireless transmit/receive unit (WTRU) via an uplink (UL) channel, the method comprising:
   receiving at least one transmit power control (TPC) step size value notification signal including TPC step size value information that enables the WTRU to define a first TPC step size value and a second TPC step size value;
   determining whether or not discontinuous transmission (DTX) of a downlink (DL) channel that controls the power of the UL channel is employed;
   receiving via the DL channel a UL TPC command subsequent to the determining; and adjusting the power of the signals transmitted via the UL channel in response to the DL TPC command by:
    incrementing or decrementing the power by the first step size value on a condition that the determining indicates that DTX of the DL channel is employed; or
    incrementing or decrementing the power by the second step size value on a condition that the determining indicates that DTX of the DL channel is not employed, wherein it is determined that DTX of the DL channel is employed on a condition that the DL channel is not received for a given predetermined time frame.

8. The method of claim 7 wherein the UL channel is a transport channel.

9. The method of claim 7 wherein the DL channel is a transport channel.

10. The method of claim 7 wherein the UL channel and the DL channel are coded composite transport channels (CCTrCHs).

11. The method of claim 7 wherein the TPC step size value notification signal is received on a dedicated control channel (DCCH).

12. The method of claim 7 wherein the TPC step size value notification signal is generated by a radio network controller (RNC).

13. A method of controlling the power of signals transmitted by a base station via a downlink (DL) channel, the method comprising:
    receiving at least one transmit power control (TPC) step size value notification signal including TPC step size value information that enables the base station to define a first TPC step size value and a second TPC step size value;
    determining whether or not discontinuous transmission (DTX) of an uplink (UL) channel that controls the power of the DL channel is employed;
    receiving via the UL channel a DL TPC command subsequent to the determining; and
    adjusting the power of the signals transmitted via the DL channel in response to the DL TPC command by:
        incrementing or decrementing the power by the first step size value on a condition that the determining indicates that DTX of the UL channel is employed; or
        incrementing or decrementing the power by the second step size value on a condition that the determining indicates that DTX of the UL channel is not employed, wherein it is determined that DTX of the UL channel is not employed on a condition that the UL channel is received in consecutive predetermined time frames.

14. A method of controlling the power of signals transmitted by a wireless transmit/receive unit (WTRU) via an uplink (UL) channel, the method comprising:
    receiving at least one transmit power control (TPC) step size value notification signal including TPC step size value information that enables the WTRU to define a first TPC step size value and a second TPC step size value;
    determining whether or not discontinuous transmission (DTX) of a downlink (DL) channel that controls the power of the UL channel is employed;
    receiving via the DL channel a UL TPC command subsequent to the determining; and
    adjusting the power of the signals transmitted via the UL channel in response to the DL TPC command by:
        incrementing or decrementing the power by the first step size value on a condition that the determining indicates that DTX of the DL channel is employed; or
        incrementing or decrementing the power by the second step size value on a condition that the determining indicates that DTX of the DL channel is not employed, wherein it is determined that DTX of the DL channel is not employed on a condition that the DL channel is received in consecutive predetermined time frames.

* * * * *